United States Patent
Wright

(10) Patent No.: US 11,307,970 B2
(45) Date of Patent: Apr. 19, 2022

(54) SYSTEMS AND METHODS FOR QUALITY CONTROL APPLICATION AND TESTING FROM PROFILE DISCOVERY

(71) Applicant: T-Mobile USA, Inc., Bellevue, WA (US)

(72) Inventor: Jason Wright, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 447 days.

(21) Appl. No.: 16/655,767

(22) Filed: Oct. 17, 2019

(65) Prior Publication Data

US 2021/0117312 A1    Apr. 22, 2021

(51) Int. Cl.
| | |
|---|---|
| *G06F 11/00* | (2006.01) |
| *G06F 11/36* | (2006.01) |
| *G06F 16/23* | (2019.01) |
| *G06F 16/21* | (2019.01) |

(52) U.S. Cl.
CPC ........ *G06F 11/3684* (2013.01); *G06F 16/211* (2019.01); *G06F 16/2379* (2019.01)

(58) Field of Classification Search
CPC ............. G06F 11/3672; G06F 11/3676; G06F 11/3684
See application file for complete search history.

(56) References Cited

U.S. PATENT DOCUMENTS

| | | | | |
|---|---|---|---|---|
| 8,666,919 | B2   | 3/2014  | Miranda et al. | |
| 2009/0319832 | A1* | 12/2009 | Zhang ................. | G06F 11/3684 714/38.1 |
| 2013/0339792 | A1* | 12/2013 | Hrastnik ............. | G06F 11/3447 714/E11.207 |
| 2014/0245068 | A1* | 8/2014  | Agarwal ............. | G06F 11/3612 714/38.1 |
| 2015/0363300 | A1* | 12/2015 | Luan ................... | G06F 11/3684 714/38.1 |

\* cited by examiner

*Primary Examiner* — Joshua P Lottich
(74) *Attorney, Agent, or Firm* — Troutman Pepper Hamilton Sanders LLP; James E. Schutz; Christopher C. Close, Jr.

(57) ABSTRACT

A system including: at least one processor; and at least one memory having stored thereon instructions that, when executed by the at least one processor, controls the at least one processor to: profile a plurality of existing data structures to generate existing profile metadata; identify a data quality level assigned to the plurality of existing data structures; access a new data structure; profile the new data structure to generate new profile metadata; determine a data quality level for the new data structure by comparing the new profile metadata to the existing profile metadata; and generate a plurality of customized data quality tests for the new data structure based on the determined data quality level for the new data structure.

20 Claims, 5 Drawing Sheets

SYSTEMS AND METHODS FOR QUALITY CONTROL APPLICATION AND TESTING FROM PROFILE DISCOVERY

FIELD

Examples of the present disclosure relate generally to data management, and, more particularly, to systems and methods of creation and execution of data quality management tests based on profile discovery and data profiling.

BACKGROUND

The growth of electronic systems has created an exponential growth of data use and database management issues and concerns. For example, large enterprises can easily maintain hundreds of thousands of data structures, with tens of thousands of large data accesses and transfers daily. In the related art, data quality management is a highly work-intensive and manual process that considers numerous factors including, for example, data domain, business function, criticality, volume, update and access frequency, movement type, source system, data use, performance requirements, technical constraints, and attribute and table considerations. Each time a company creates a new data structure or data process, properly managing the new data structure requires individual decisions about the quality level required, data quality tests must be creation and customization, and then the data quality tests must be properly executed and potential data quality issues resolved. Such processes are labor-intensive and prone to error, both in test creation and selection.

Applying all possible data checks to all data creates enormous overhead. Applying hundreds or thousands of data quality tests to each piece of data creates unnecessary overhead that can render database systems functionally inoperable. Furthermore, even applying just high level data quality checks on the data can create unreasonable overhead that greatly reduces the ability to access the database, and transmit and manipulate data. Data quality errors, whether causing delays, inaccuracy, or lack of verification, create residual negative effects and computational bottlenecks.

Accordingly, there is a need for improved systems and methods for applying, executing, and updating data quality controls. More specifically, a need exists for providing data quality control analysis, testing, and monitoring to improve the functionality of data and networked systems. Aspects of the present disclosure are related to these and other concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, the proliferation of data structures has created bottlenecks in data flow and access, as well as insufficient data quality controls. The related art relies upon individualized assessments of each new data structure, which is prone to over- and under-inclusive data quality controls. Such failures waste valuable resources and compromise the validity of business data, which negatively impact the operation of databases and networked systems.

Therefore, it is desirable to have an improved mechanism for providing data quality control analysis, testing, and monitoring. In some examples of the present disclosure, data quality management decisions of existing data structures are identified and applied prospectively to new data structures or processes, and corresponding data quality tests are generated and scheduled. The system profiles existing data structures and links the data quality controls to the data profiles. When a new data structure is created or received, the system profiles the new data structure and compares the new structure data profile to one or more existing structure data profiles. Data quality levels are applied to the new data structure based the comparison, and the system creates corresponding data quality tests for the new data structure in accordance with the applied data quality measures, and schedules and/or executes the tests accordingly. The execution schedule can be further based on the comparison between the existing structure profiles and the new structure profile.

In an embodiment, the system can create generalized data quality tests from data quality tests applied to existing data structures. The system can then create data quality tests for the new data structure by customizing the generalized data quality tests to the new data structure metadata. The system can also identify changes to data sets or structures (e.g., through monitoring changes, a comparison, or an ad hoc re-analysis) and generate new data quality tests based on the changes. For example, in response to detecting a change in profile metadata for the new data structure, the new data structure can be reprofiled, and new data quality tests and/or schedules can be created for the new data structure.

Reference will now be made in detail to aspects of the disclosed technology, examples of which are illustrated in the accompanying drawings and disclosed herein. Wherever convenient, the same reference numbers will be used throughout the drawings to refer to the same or like parts.

Figure 1:
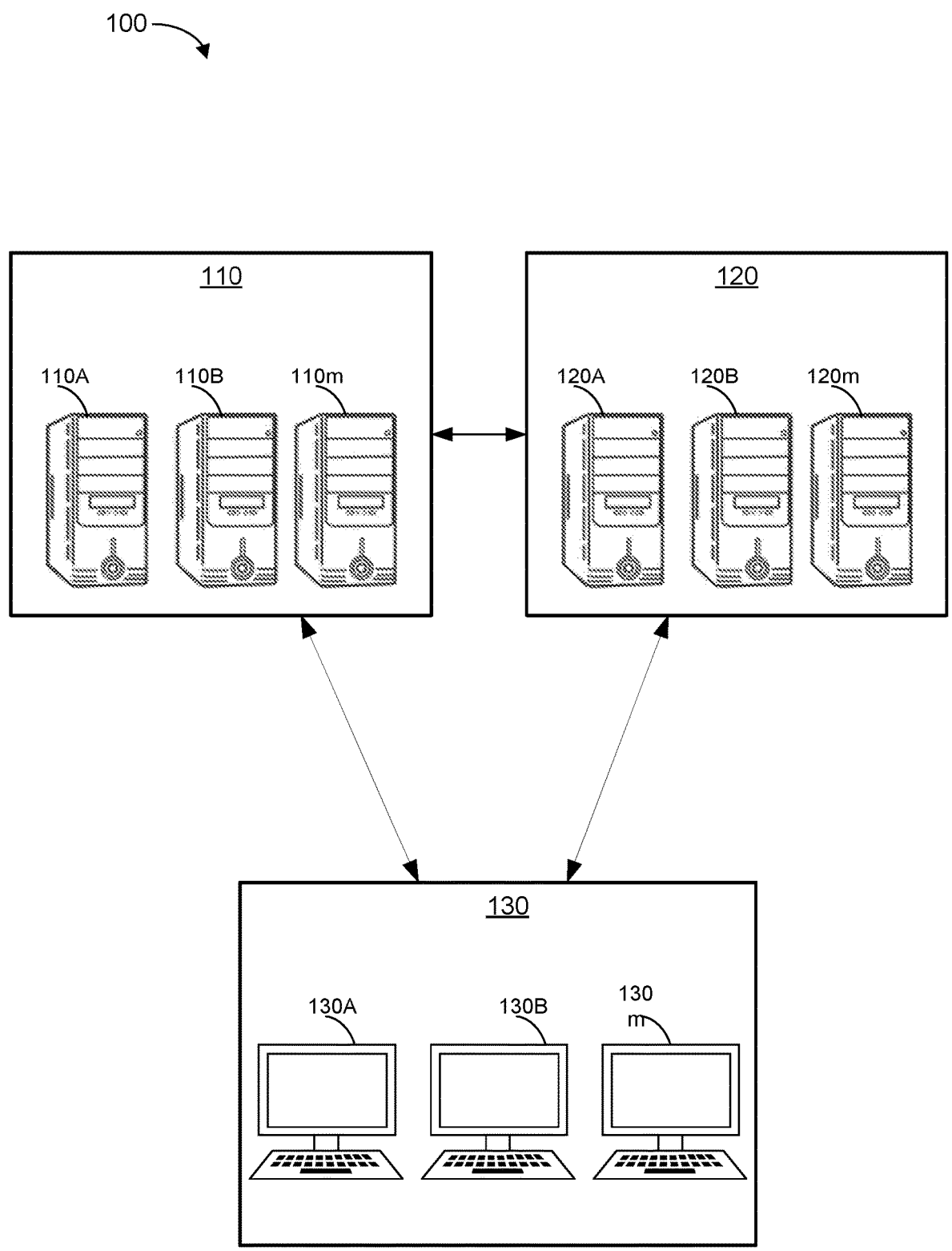
FIG. 1 is a diagram of an example of a system environment for a data quality control application in accordance with aspects of the present disclosure.

As shown in FIG. 1, an example of the present disclosure can comprise a system environment 100 in which endpoint connection and communication in accordance with some examples of the present disclosure can be performed. The components and arrangements shown in FIG. 1 are not intended to limit the disclosed embodiments as these components and features can vary. In FIG. 1, the system environment 100 can include one or more Processing Servers 110A-110m, one or more Data Servers 120A-120n, and one or more Terminals 130A-130o. In some examples, Processing Server 110, Data Server 120, and Terminal 130 can communicate with one another. Additionally, one or more of Processing Servers 110A-110m, one or more of Data Servers 120A-120n, and one or more of Terminals 130A-130o can communicate with each other (e.g., Terminal 130A can communicate with Terminal 130B). Processing Servers 110A-110m, the one or more Data Servers 120A-120n, and the one or more Terminals 130A-130o can each include one or more processors, memories, and/or transceivers. As non-limiting examples, the one or more Terminals 130A-130o can be cell phones, smartphones, laptop computers, tablets, or other personal computing devices that include the ability to communicate on one or more different types of networks. Processing Servers 110A-110m and/or the one or more Data Servers 120A-120n can include one or more physical or logical devices (e.g., servers, cloud servers, access points, etc.) or drives. An example computer architecture that can be used to implement Terminals 130A-130o, Processing Servers 110A-110m, and Data Servers 120A-120n is described below with reference to FIG. 5.

With the continued growth, Data Server 120 can be, for example, a repository for enterprise data. When a user of Terminal 130 and/or Processing Server 110 desires to compile, analyze, or otherwise access data structures stored on Data Server 120, data quality analysis can be applied to the relevant data structures either before or after exchanging the data. The data quality analysis guarantees certain data quality characteristics in accordance with an assigned data quality level (e.g., was the data read correctly, was all of the data received, were there are memory or other hardware constraints, were there logical errors with the data selection). The dimensions of quality (e.g., data quality characteristics) can include accuracy (e.g., how well the data conforms to known and/or trusted real world characteristics), completeness (e.g., are all mandatory fields of data populated, i.e., are not null or empty strings), consistency (e.g., how consistently data on a same event or item is represented in multiple data sets and/or entries, such as an account being listed as closed, but pay status being active), integrity (e.g., validity of data across relationships such that each data item is linked appropriately, such as each address being linked to a customer record), reasonability (e.g., how reasonable the data values are for the specific data structure, such as a client order being larger than possible), timeliness (e.g., how close to a real world event reflected in the data was the data updated), uniqueness/deduplication, validity (e.g. does the data-type stored in the structure match the structure's metadata), and accessibility (e.g., how quickly new data entries and changes are available for analysis). A non-limiting example of data quality checking for different levels is provided below in Table 1.

Additionally, as the data structures are adapted or reclassified, the previously applied tests can no longer be valid, necessary, or sufficient. Thus, in the related art, inefficiencies and inaccuracies of data repositories and data transfers are created. Accordingly, aspects of the present disclosure involve a new adaptive approach to data quality control, improving the operation of the system.

Processing Server 110 can analyze existing data structures in Data Server 120. For example, Processing Server 110 can profile (e.g., perform data profiling) a plurality of existing data sets to generate profile metadata corresponding to the existing data structures. The profile metadata refers to various aspects of the data structure and its attributes, such as, as non-limiting examples, primary key, foreign keys, field identity, type of table (e.g., fact, dimension, slowly changing dimension), along with system type (e.g., finance data, customer data). The profile metadata for the existing data structures is associated with a data quality level assigned to the respective data structure. When a new data structure is created, found, or uploaded, Processing Server 110 profiles (e.g., through data profiling) the new data structure, generating profile metadata for the new data structure.

Processing Server 110 compares the profile metadata for the new data structure to the profile data of the existing data structures and applies a data quality level to the new data structure based on that comparison. The comparison can be based on, for example, whether the attribute is used by a DBA, whether the table is a temporary table, viability of the structure, and type of table/structure. If the new data structure profile metadata is most similar to one or more existing data structure profile metadata with a data quality level 3 applied, data quality level 3 is applied to the new data structure. In an embodiment, profile metadata can include critical data elements (CDEs), which can be definitive (or strongly weighted) as to a data quality level. CDEs can be identified in a new data structure, for example, by analyzing an assigned name and attributes of a data element to deduce whether the data element is a CDE. For example, if data structures holding customer payment information must always utilize the highest data quality level (e.g., DQL 1), or if the new data structure profile metadata indicates that the new data structure incorporates customer payment data,

TABLE 1

| Data Quality Check | Data Quality Level (DQL) 1 | DQL 2 | DQL 3 | DQL 4 (Not Qualified) | DQL 5 (Undiscovered) |
|---|---|---|---|---|---|
| Audit | Full Record compare | Aggregate Numeric Value | Row Counts | N/A | N/A |
| Balance | Mismatched Records | Unreconciled CheckSum | Unreconciled Row Count | N/A | N/A |
| Control | Pause job/Escalation | Pause job/Notify | Fail | N/A | N/A |
| Threshold | 99.9% | 99% | 95% | N/A | N/A |
| Error Handling and Metadata | Error Record Capture | Error Detail Log | Error Summary Log | N/A | N/A |
| Notification | Escalation | Pier Trouble Ticket | Email | Cataloged | Profiled |
| Validation | Range/Domain, Business Rules | Referential Integrity | Nulls, Data Types | N/A | N/A |
| Reconcile | Source to Report | Source to Core | Layer to Layer | N/A | N/A |

In the related art, applying data quality controls requires individual review of each data structure for test selection and test creation that conforms to the data structure. As discussed above, this is a time-consuming and error-prone process.

DQL 1 can be applied to the new data structure. In an embodiment, dimension tables that are unchanging or unchangeable, DQL 3 can be applied, reference data can be given a DQL 2, and facts are given a DQL 1.

Processing Server 110 can generate data quality tests for the new data structure based on the determined data quality level for the new data set. In an embodiment, Processing Server 110 can analyze the existing data structures to determine the type and scope of data quality tests associated with the existing profile metadata. The type and scope of test can be used to determine a data quality level, along with creating standardization across data quality levels. In other words, in an embodiment, a continuum of data quality levels can be generated based on individualized data elements, data repositories, and table type. In an embodiment, Processing Server 110 can create uniformity across a predetermined number of data quality levels. For example, as mentioned previously, different data structures nominally being assigned a same data quality level can have applied different data quality tests. Processing Server 110 can determine, by cross-referencing between the existing data structures, group the data structures into a defined number of data quality levels. Processing Server 110 can then select from among the different tests applied to data structures within each group, and apply a standardized selection of tests across each group.

Processing Server 110 can generalize these tests to create testing templates for the respective data quality controls. Templatization can include, for example, creation of a control for the test, that identifies how the test works, who's to be notified, scope, and thresholds of success. The controls can be specialized for specific databases, database pairs (e.g., transfer pairs), and types of data. Additionally, templatization can further include identifying, within the test, table and element specific fields. Generating data quality tests for the new data structure can be performed by specializing the created templates to the new profile metadata. For example, control schemas related to database storing the new data structure may be applied to the template data quality test, and table and element specific field of the new data structure may be assigned to the template.

Processing Server 110 can update data quality levels and controls on data structures as the structures or there use changes over time. For example, if a data structure is decertified or renamed (e.g., as a legacy table), the data quality level can be adjusted down to DQL 5. As another example, if a data structure is modified to include an additional field (e.g., a CDE field), the change in profile metadata can trigger the data quality level to be adjusted upward. Processing Server 110 can adjust the data quality level and create or suspend data quality tests accordingly.

In an embodiment, results of the data quality test can be tracked over time (e.g., by Processing Server 110 and/or Data Server 120). Based on the results of the data quality test, test frequency (e.g., throttle) or stringency may be adjusted. For example, if a first data quality test is originally executed each time a data structure is transferred but, after 100 runs, no errors were detected, Processing Server 110 can reduce the frequency of the test (e.g., to once every 10 transfers, or once every week).

Figure 2:
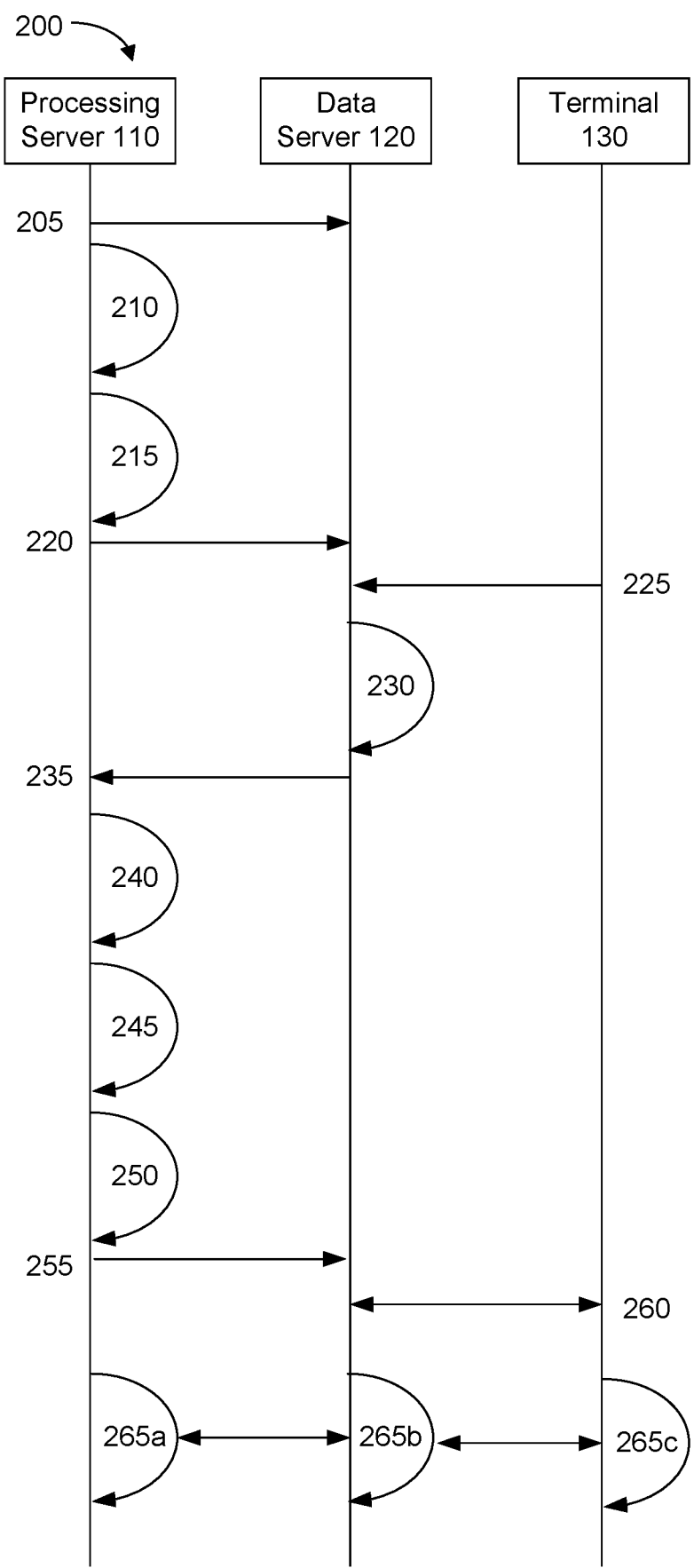
FIG. 2 shows a timing diagram depicting a method of providing data quality control in accordance with aspects of the present disclosure.

FIG. 2 illustrates a timing diagram for an example of a method 200 for data quality control application and testing utilizing profile discovery. The timing diagram illustrates a Terminal 130, a Data Server 120, and a Processing Server 110. Referring to FIG. 2, at 205, Processing Server 110 accesses existing data structures stored on Data Server 120 (e.g., Data Servers 120a-120n). At 210, Processing Server 110 performs data profiling on the existing data structure, creating profile metadata. Data profiling can include, for example, profiling aspects and attributes of the data structure, such as primary key, foreign keys, field identity, type of table (e.g., fact, dimension, slowly changing dimension), along with system type (e.g., finance data, customer data).

At 215, Processing Server 110 determines a data quality level associated with the existing data structure. In an embodiment, the data quality level can be identified from a tag or metadata field associated with the existing data structure which specifies the data quality level. In an embodiment, data quality levels can be determined implicitly based on a type and scope of one or more data quality tests associated with the existing data structure. In some cases, the data quality level explicitly assigned to the existing data structure may not match the data quality tests assigned to the existing data structure. In such cases, Processing Server 110 may alter the tests assigned to the existing data structure to match the assigned data quality level. For example, if the existing data structure is assigned a DQL 1, but the tests assigned are between a DQL 2 and a DQL 1, Processing Server 110 may generate additional tests for the existing data structure (e.g., from testing templates as discussed below), and apply the new tests to the existing data structure so that the assigned data quality level matches the assigned tests. As an example, completeness tests can include a row-count (typically assigned for DQL 3), an attributes check summing test (typically applied for DQL 2), and a row-by-row attribute comparison (typically assigned to DQL 1). If the existing data structure is assigned DQL 1 and an attributes check summing completeness nest (typically assigned for DQL 2), Processing Server 110 can generate and assign a row-by-row attribute comparison test for the existing data structure, In an embodiment, Processing Server 110 can extract the tests associated with the existing data structures and generate testing templates associated with the data quality level. At 220, Processing Server 110 associates the data quality level with the profile metadata (e.g., by storing the association in Data Server 120).

At 225, Terminal 130 requests the creation of a new data structure. For example, Terminal 130 can provide data fields and sources for a new data table to Data Server 120. At 230, Data Server 120 generates the new data structure and, at 235, alerts Processing Server 110 of the new data structure. At 240, Processing Server 110 performs data profiling on the new data structure, creating profile metadata. The data profiling can be similar to the previous data profiling performed on the existing data structures. At 245, Processing Server 110 then compares the existing profile metadata to the profile metadata of the new data structure. Processing Server 110 identifies existing data structures having existing profile metadata closest to the profile metadata of the new data structure, and assigns a data quality level to the new data structure corresponding to identified existing data structures. Accordingly, Processing Server 110 can leverage existing data structures to improve the functioning and performance of computer systems and the validity of future data structures. In an embodiment, Processing Server 110 can generate data quality tests for the new data structure, for example, by customizing the test templates generated for the assigned data quality level. Customizing the test templates can include, for example, replacing generic elements in the testing template with structure-specific properties (e.g., structure name/address (e.g., schema name and location), field name (e.g., attributes), pointers (e.g., denoting system accounts), structure dimensions (e.g., relationships), type (e.g., alphanumeric, integer, floating point, etc.), uniqueness, and null/not null) of the new data structure. At 255, Processing Server 110 schedules the data quality tests for the new data structure.

At 260, Terminal 130 requests the new data structure from Data Server 120. At 265a-265c, Processing Server 110, Data Server 120, and/or Terminal 130 run the assigned tests. For example, as necessary, Data Server 120 can run completeness tests, Processing Server 110 can run an audit on the new data structure, and Terminal 130 can perform consistency tests. However, this is merely an example, and, in some cases, one or more of Processing Server 110, Data Server 120, and/or Terminal 130 can individually or collectively perform the assigned data quality testing.

Figure 3:
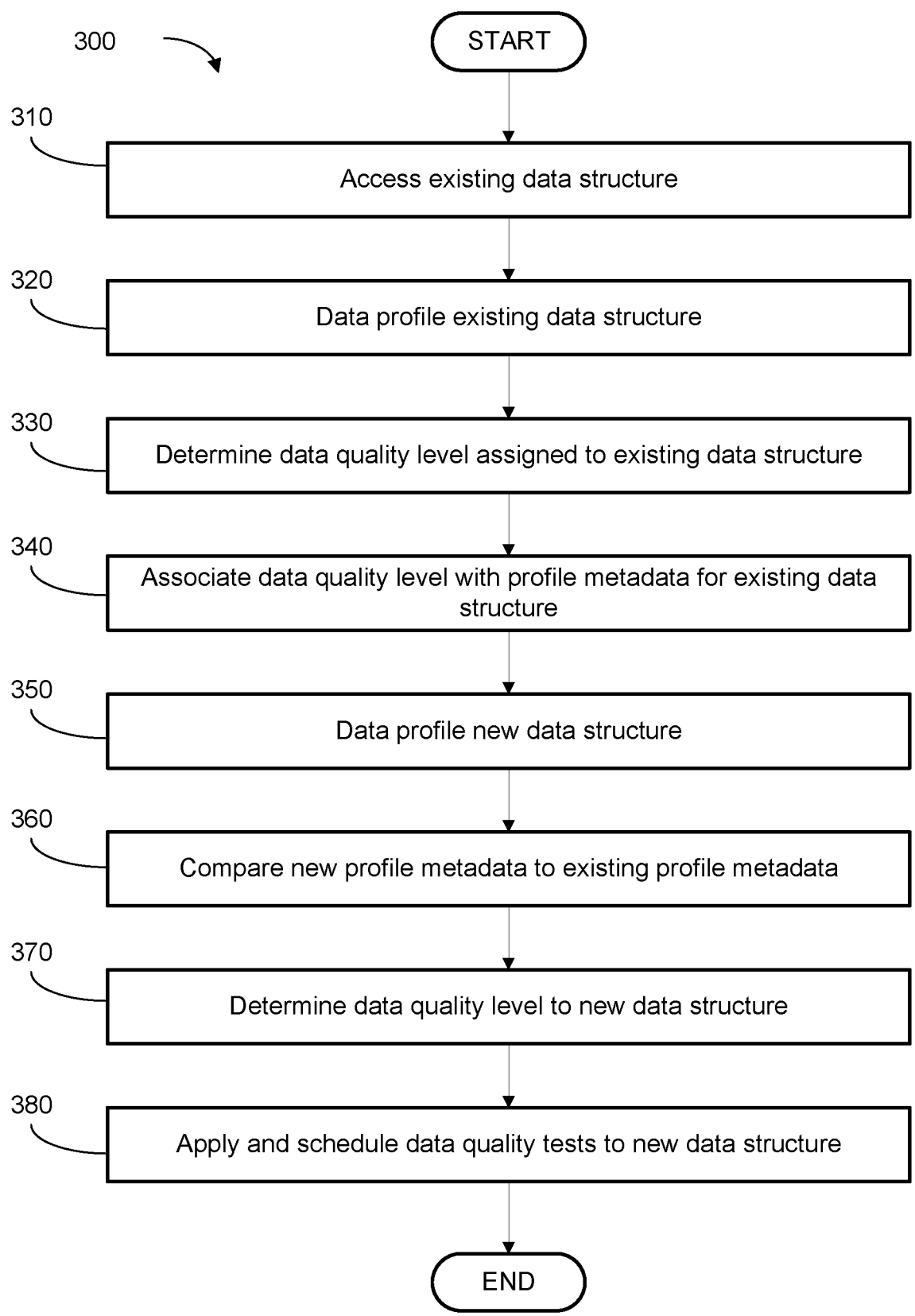
FIG. 3 is a flowchart depicting data quality control application in accordance with aspects of the present disclosure.

FIG. 3 illustrates a flowchart for an example of a method 300 for data quality control application in accordance with aspects of the present disclosure. The flowchart illustrates method 300 from the perspective of Processing Server 110 (e.g., Processing Server 110A-130m), but this is merely an example. At 310, Processing Server 110 accesses existing data structures and, at 320, performs data profiling on the existing data structure. At 330, Processing Server 110 determines data quality levels assigned to the existing data structures. For example, data quality levels can be determined based on the type and scope of one or more data quality tests associated with the existing data structure. In an embodiment, Processing Server 110 can extract the tests associated with the existing data structures and generate testing templates associated with the corresponding assigned data quality levels. At 340, Processing Server 110 stores the data quality levels in association with the profile metadata for the existing data structures.

At 350, Processing Server 110 detects a new data structure (e.g., the creation of a new data structure in Data Server 120) and performs data profiling on the new data structure. The data profiling of the new data structure can be substantially similar to the data profiling on the existing data structures. Once the new data structure is profiled, at 355, Processing Server 110 compares the profile metadata of the new data structure with the profile metadata of the existing data structures. Based on the comparison, at 360, Processing Server 110 determines a data quality level for the new data structure (e.g., a data quality level that is associated with the closes profile metadata for one or more existing data structure(s)), and assigns the data quality level to the new data structure. Then, at 380, Processing Server 110 applies and schedules data quality tests to the new data structure in accordance with the assigned data quality level. Scheduling the data quality tests may be based on, for example, one or more of a periodic schedule (e.g., weekly), an access-rate schedule (e.g., after every 10th the data structure is accessed), or upon transfer of the data structure (e.g., before, after or during transfer of the data elements in the data structure).

In an embodiment, Processing Server 110 creates data quality tests for the new data structure. Creating the data quality tests can include selecting and/or customizing one or more testing templates associated with the data quality level and applicable to the new data structure or hosting database. For example, certain databases automatically run uniqueness tests on data within the database. Such database-specific inapplicability may be determined by, for example, determining that all existing data structures on that database do not run a certain type of test, or a certain test at a given data quality level. Additionally, for example, pattern tests are inapplicable on floating point elements (attributes). Such database-specific inapplicability may be determined by, for example, determining that all existing data structures of a specific data type do not have assigned a certain type of test, or a certain test at a given data quality level. To improve the functioning and efficiency of the system, creating the data quality tests may exclude tests inapplicable for a certain database or data attribute.

In an embodiment, the profile metadata and associated data quality levels of the existing data structures can be fed through one or more machine-learning algorithms. The one or more machine-learning algorithms may include, for example, linear regression or random forest models. This process can train the machine learning algorithm(s) to determine relationships between the profile metadata and the assigned data quality level. The profile metadata for the new data structure can then be fed through the trained machine-learning algorithm(s), which outputs a recommended data quality level that can then be applied to the new data structure.

Although the method 300 has been discussed with reference to a Processing Server 110, this is merely an example. One of ordinary skill will recognize in light of the present disclosure that aspects of the present disclosure can be implemented by Data Server 120, Terminal 130 and/or other systems or devices.

Figure 4:
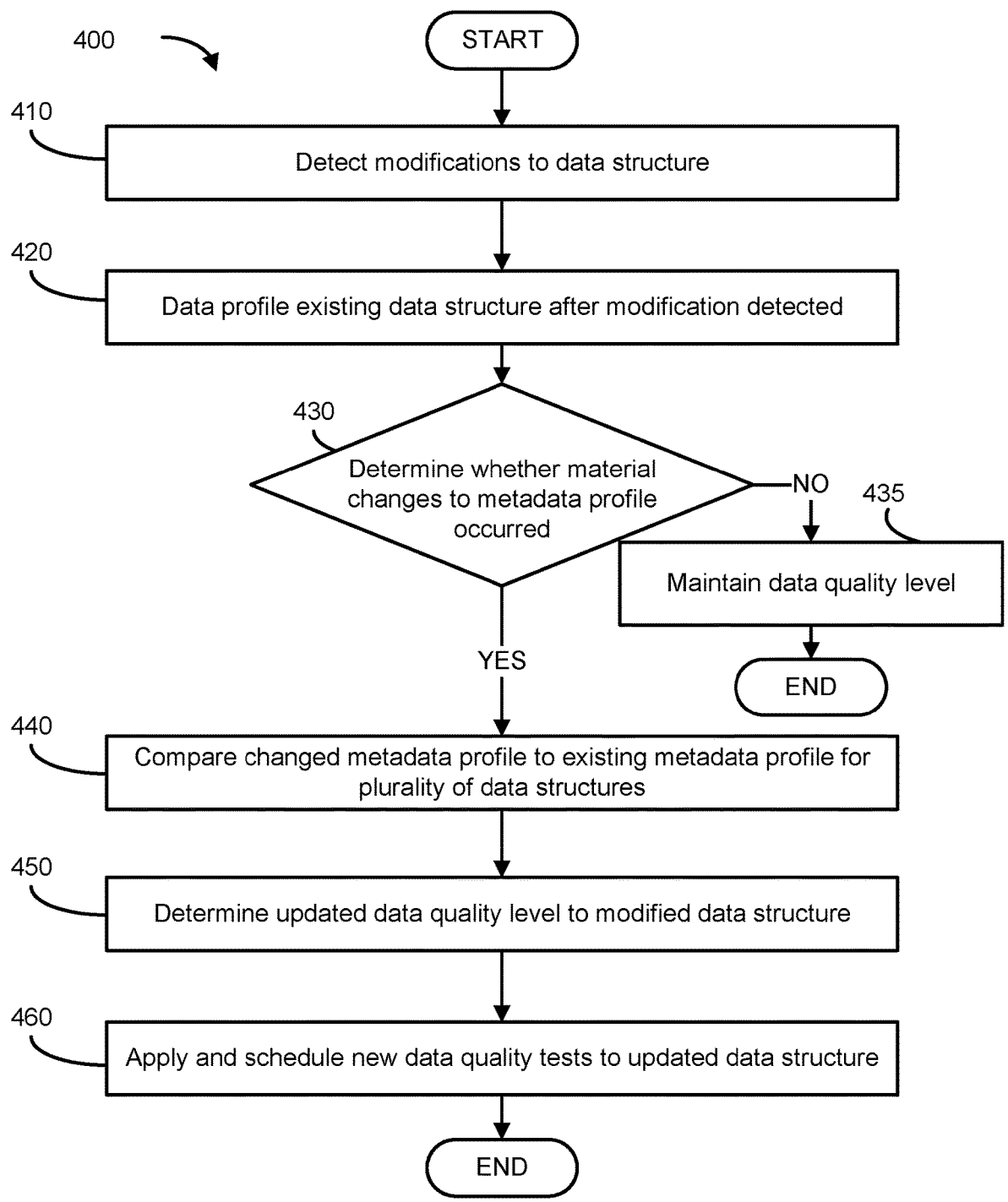
FIG. 4 is a flowchart depicting a method for dynamic data quality control updating in accordance with aspects of the present disclosure.

FIG. 4 is a flowchart of an example of a method 400 for dynamically updating data quality control in accordance with aspects of the present disclosure. As will be understood by one of ordinary skill in light of the present disclosure, data structures may be modified over-time in accordance with usage patterns. However, the related art provides no ability to track and update assigned data quality levels and tests to match the adjustments. Aspects of the present disclosure address these issues. The flowchart illustrates method 400 from the perspective of Processing Server 110 (e.g., Processing Server 110A-110m), but this is merely an example. At 410, Processing Server 110 detects modification to an existing data structure. For example, Processing Server 110 can monitor changes to data structures (e.g., name changes, data certification, changes to fields). In an embodiment, Processing Server 110 can monitor updates to metadata of the data structure which are processed when the data structure changes, and/or the Processing Server 110 can receive updates from a device (e.g., Data Server 120 and/or Terminal 130) when a data structure is updated.

At 420, Processing Server 110 performs data profiling on the modified data structure (e.g., re-profiling the data structure). At 430, Processing Server 110 determines whether a material change to the metadata profile has occurred. For example, Processing Server 110 can compare the metadata profile of the modified data structure to the metadata profile of the data structure pre-modification. If no material changes have occurred, the data quality level to the modified data structure is maintained at 435, and the update ceases. For example, in an embodiment, if the change adds attributes to a data structure having a DQL 1, no additional steps can be necessary as, in some cases, the addition of fields will not lower the data quality level. Similarly, if the update to the data structure is a renaming of a table title (e.g., "Customer Profiles" v. "Consumer Profiles"), no changes to the data quality level will be required.

If a material change to the metadata profile is detected, at 440, Processing Server 110 compares the metadata profile of the modified data structure with existing metadata profiles for a plurality of existing data structures. Based on the comparison, at 450, Processing Server 110 determines an updated data quality level for the modified data structure (e.g., a data quality level that is associated with the closes profile metadata for one or more existing data structure(s)), and assigns the updated data quality level for the modified data structure. Then, at 460, Processing Server 110 applies and schedules new data quality tests to the modified data structure in accordance with the assigned updated data quality level. In an embodiment, Processing Server 110 creates data quality tests for the modified data structure. Creating the data quality tests can include selecting and customizing one or more testing templates associated with the updated data quality level and applicable to the modified data structure. In a case where the data quality level is lowered, Processing Server 110 can de-schedule or otherwise deactivate applied data quality tests that are required by the original data quality level, but are no longer required by the updated data quality level.

FIG. 4 is described in terms of Processing Server 110. However, this is merely an example. In light of the present disclosure, one of ordinary skill will recognize that various other systems (e.g., Terminals 130A-130o and/or Data Servers 120A-120n) can perform a similar method as described above.

Figure 5:
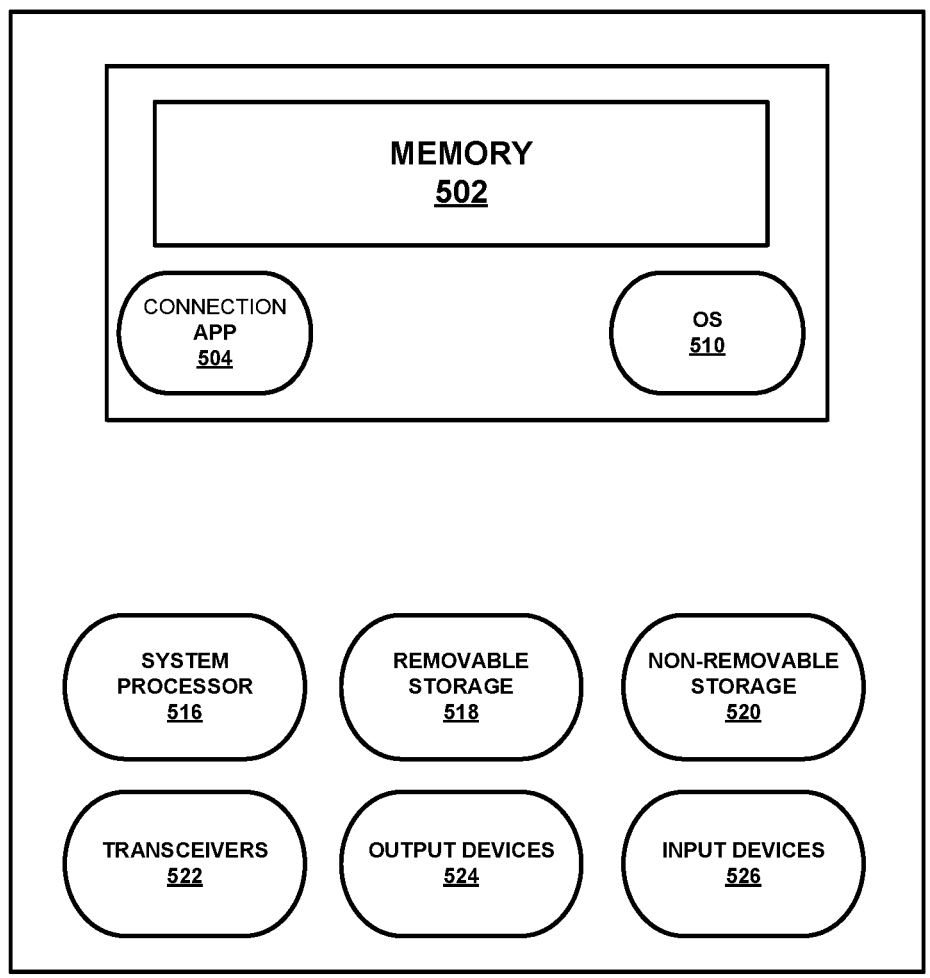
FIG. 5 is an example of a device for use with the systems and methods disclosed herein, in accordance with some examples of the present disclosure.

As shown in FIG. 5, the system environment 100 and methods 200, 300, 400 can also be used in conjunction with a device 500 (e.g., Processing Server 110, Data Server 120, and/or Terminal 130). The device 500 can comprise, for example, a desktop or laptop computer, a server, a bank of servers, or a cloud-based server bank. Thus, while the device 500 is depicted as a single standalone server, other configurations or existing components could be used. In some examples, the device 500 can comprise existing network entities such as, for example, a home location register (HLR), home subscriber service (HSS), a third-generation partnership project authentication, an authorization and accounting (3GPP AAA) server, or another server or component. The device 500 can implement aspects of Processing Server 110, Data Server 120, and/or Terminal 130.

The device 500 can comprise a number of components to execute the above-mentioned functions and apps. As discussed below, the device 500 can comprise memory 502 including many common features such as, for example, the OS 510. In various implementations, the memory 502 can be volatile (such as random access memory (RAM)), non-volatile (such as read-only memory (ROM), flash memory, etc.), or some combination of the two. The memory 502 can include all, or part, of the functions of a connection app 504, among other things.

The memory 502 can also include the OS 510. Of course, the OS 510 can vary depending on the manufacturer of the device 500 and the type of component. Many servers, for example, run Linux or Windows Server. Dedicated cellular routing servers can run a specific telecommunications OS 510. The OS 510 contains the modules and software that supports a computer's basic functions, such as scheduling tasks, executing applications, and controlling peripherals.

A connection app 504 can provide communication between the device 500 and external systems (e.g., Processing Server 110, Data Server 120, and/or Terminal 130). The device 500 can also comprise one or more system processors 516. In some implementations, the system processor(s) 516 can include a central processing unit (CPU), a graphics processing unit (GPU), or both CPU and GPU, or any other sort of processing unit. The device 500 can also include one or more of removable storage 518, non-removable storage 520, one or more transceiver(s) 522, output device(s) 524, and input device(s) 526.

System processor 516 can be configured to receive a request to connect to an external device (e.g., Terminal 130 or another device 500). System processor 516 can request (e.g., from Processing Server 110, Data Server 120, and/or Terminal 130) attestation of the external device. For example, attestation can be a self-attestation stored on a ledger of the Processing Server 110. Based on the attestation, the system processor 516 can either establish a connection with the external device (if the external device is determined to be valid), or deny the request to connect to the external device (if the external device is determined to be compromised).

The device 500 can also include additional data storage devices (removable and/or non-removable) such as, for example, magnetic disks, optical disks, or tape. Such additional storage is illustrated in FIG. 5 by removable storage 518 and non-removable storage 520. The removable storage 518 and non-removable storage 520 can store some, or all, of the OS 510, and connection app 504.

Non-transitory computer-readable media can include volatile and nonvolatile, removable and non-removable tangible, physical media implemented in technology for storage of information, such as computer-readable instructions, data structures, program modules, or other data. The memory 502, removable storage 518, and non-removable storage 520 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information, and which can be accessed by the device 500. Any such non-transitory computer-readable media can be part of the device 500 or can be a separate database, databank, remote server, or cloud-based server.

In some implementations, the transceiver(s) 522 include any sort of transceivers known in the art. In some examples, the transceiver(s) 522 can include a wireless modem to facilitate wireless connectivity with Terminals 130, additional servers, the Internet, and/or an intranet via a cellular connection. Further, the transceiver(s) 522 can include a radio transceiver that performs the function of transmitting and receiving radio frequency communications via an antenna (e.g., Wi-Fi or Bluetooth®). In other examples, the transceiver(s) 522 can include wired communication components, such as a wired modem or Ethernet port, for communicating with the other user equipment (UEs) or the provider's Internet-based network. The transceiver(s) 522 can transmit requests to and receive attestation information from Processing Server 110, Data Server 120, and/or Terminal 130, among other things.

In some implementations, the output device(s) 524 can include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the device 500 is connected to a network, the type of data being received (e.g., a match vs. a request for service listings), when SIM-OTA messages are being transmitted, etc. Output device(s) 524 can also include ports for one or more peripheral devices, such as headphones, peripheral speakers, or a peripheral display.

In various implementations, input device(s) 526 includes any sort of input devices known in the art. For example, the input device(s) 526 can include a camera, a microphone, a keyboard/keypad, or a touch-sensitive display. A keyboard/keypad can be a standard push-button alphanumeric, multi-key keyboard (such as a conventional QWERTY keyboard), virtual controls on a touchscreen, or one or more other types of keys or buttons, and can also include a joystick, wheel, and/or designated navigation buttons, or the like.

The specific configurations, machines, and the size and shape of various elements can be varied according to particular design specifications or constraints requiring a Processing Server 110, Data Server 120, Terminal 130, server 500, system environment 100, or method 200, 300, 400 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, and all changes that come within the meaning and range of equivalents thereof are intended to be embraced therein.

The following characterizing clauses are further provided as additional description of the disclosed invention. The inclusion of reference numbers is the following clauses is to facilitate understanding of an exemplary embodiment but should not be considered limiting in any way.

Clause 1: A system including: at least one processor; and at least one memory having stored thereon instructions that, when executed by the at least one processor, controls the at least one processor to: profile a plurality of existing data structures to generate existing profile metadata; identify a data quality level assigned to the plurality of existing data structures; access a new data structure; profile the new data structure to generate new profile metadata; determine a data quality level for the new data structure by comparing the new profile metadata to the existing profile metadata; and generate a plurality of customized data quality tests for the new data structure based on the determined data quality level for the new data structure.

Clause 2: The system of Clause 1, wherein the instructions, when executed by the at least one processor, further control the at least one processor to analyze the plurality of existing data structures to determine data quality tests associated with the existing profile metadata, and the plurality of customized data quality tests is generated based on the data quality tests associated with the existing profile metadata.

Clause 3: The system of Clause 2, wherein the instructions, when executed by the at least one processor, further control the at least one processor to generate the plurality of customized data quality tests by: templatizing the data quality tests associated with the existing profile metadata; and customizing a subset of the templatized data quality tests in accordance with the new profile metadata to create the plurality of customized data quality tests.

Clause 4: The system of Clauses 2 or 3, wherein the instructions, when executed by the at least one processor, further control the at least one processor to generate the plurality of customized data quality tests based on a subset of the data quality tests associated with the existing profile metadata having a data quality level consistent with the determined data quality level of the new data structure.

Clause 5: The system of any of Clauses 1-4, wherein the instructions, when executed by the at least one processor, further control the at least one processor to: schedule the plurality of customized data quality tests based on comparing the new profile metadata to the existing profile metadata; and execute the scheduled customized data quality tests.

Clause 6: The system of Clause 5, wherein the plurality of customized data quality tests are scheduled to execute in accordance with at least one from among a transfer of the data structure, a periodic schedule, and in accordance with a n access-rate schedule structure.

Clause 7: The system of any of Clauses 1-6, wherein the instructions, when executed by the at least one processor, further control the at least one processor to: identify a change in the new data structure; reprofile the new data structure in response to identifying the change in the new data structure to generate updated profile metadata for the new data structure; determine an updated data quality level for the new data structure by comparing the updated profile metadata to the existing profile metadata; and generate a plurality of updated customized data quality tests for the new data structure based on the updated data quality level.

Clause 8: The system of Clause 7, wherein the instructions, when executed by the at least one processor, further control the at least one processor to, in response to determining that the updated data quality level of the new data structure is greater than the determined data quality level, generate one or more data quality tests for the new data structure that are not required by the determined quality level and are required for the updated data quality level.

Clause 9: The system of Clauses 7 or 8, wherein identifying the change in the new data structure includes receiving, from a database storing the new data structure, an indication that the new data structure has been modified by at least one from among, adding a data element field to the new data structure, removing a data element field to the new data structure, and reclassifying the new data structure.

Clause 10: The system of any of Clauses 1-9, wherein the instructions, when executed by the at least one processor, further control the at least one processor to determine a data quality level for the new data structure by: extracting, for each of a plurality of data elements within the new profile metadata, a data element name, data element type, and data element structure; matching the data element name, data element type, and data element structure of one or more of the plurality of data elements within the new profile metadata to respective data elements within the existing profile metadata; and assigning a data quality level to the new data structure based on the matching.

Clause 11: The system of Clause 10, wherein the instructions, when executed by the at least one processor, further control the at least one processor to analyze the existing profile metadata to identify one or more critical data elements, the matching includes matching the data element name, data element type, and data element structure of one or more of the plurality of data elements within the new profile metadata to respective critical data elements of the one or more critical data elements, and assigning a data quality level to the new data structure includes assigning the data quality level based on the matched critical data element.

Clause 12: The system of any of Clauses 1-11, wherein identifying the data quality level assigned to a first existing data structure of the plurality of existing data structures includes: identifying one or more data quality tests associated with the existing profile metadata of the first existing data structure, determining that the one or more one or more data quality tests associated with the existing profile metadata of the first existing data structure conform closest to a first data quality level of a plurality data quality levels; and identifying the first data quality level as the data quality level assigned to a first existing data structure.

Clause 13: The system of Clause 12, the instructions, when executed by the at least one processor, further control the at least one processor to: determine that the one or more data quality tests associated with the existing profile metadata of the first existing data structure do not completely conform to the first data quality level, and generate one or more customized data quality tests for the first existing data structure to be added to the one or more data quality tests associated with the existing profile metadata of the first existing data structure.

Clause 14: The system of any of Clauses 1-13, wherein the instructions, when executed by the at least one processor, further control the at least one processor to: schedule the plurality of customized data quality tests; track an error detection rate of the scheduled plurality of customized data quality tests; and throttle the schedule in response to the error detection rate exceeding a predetermined threshold.

Clause 15: A system including: at least one processor; and at least one memory having stored thereon instructions that, when executed by the at least one processor, controls the at least one processor to: profile a plurality of existing data structures to generate existing profile metadata; analyze the plurality of existing data structures to determine data quality tests associated with the existing profile metadata; store the data quality tests associated with the existing profile metadata in correspondence with the existing profile metadata; identify a change in profile metadata for a first existing data structure of the plurality of existing data structures indicative of an update to the first existing data structure; reprofile the first existing data structure to generate new profile metadata; and generate a plurality of customized data quality tests for the first existing data structure based on the new profile metadata and the data quality tests associated with the existing profile metadata.

Clause 16: The system of Clause 15, wherein the instructions, when executed by the at least one processor, further control the at least one processor to determine that a new data quality level of the first existing data structure is greater than an existing data quality level for the first existing data structure, and generating the plurality of customized data quality tests for the first existing data structure includes generating one or more customized data quality tests for the first existing data structure that are not required by the existing data quality level and are required for the new data quality level.

Clause 17: The system of Clauses 15 or 16, wherein the instructions, when executed by the at least one processor, further control the at least one processor to determine that a new data quality level of the first existing data structure is less than an existing data quality level for the first existing data structure, and generating the plurality of customized data quality tests for the first existing data structure includes de-scheduling data quality tests required for the existing data quality level and not required for the new data quality level.

Clause 18: The system of any of Clauses 15-17, wherein the instructions, when executed by the at least one processor, further control the at least one processor to generate the plurality of customized data quality tests by comparing the new profile metadata to the existing profile metadata.

Clause 19: A data quality control method including: profiling a plurality of existing data structures to generate existing profile metadata; identifying a data quality level assigned to the plurality of existing data structures; accessing a new data structure; profiling the new data structure to generate new profile metadata; determining a data quality level for the new data structure by comparing the new profile metadata to the existing profile metadata; and generating a plurality of customized data quality tests for the new data structure based on the determined data quality level for the new data structure.

Clause 20: The method of Clause 19 further including analyzing the plurality of existing data structures to determine data quality tests associated with the existing profile metadata, wherein the plurality of customized data quality tests are generated based on the data quality tests associated with the existing profile metadata.

Clause 21: The method of Clause 20, wherein generating the plurality of customized data quality tests includes: templatizing the data quality tests associated with the existing profile metadata; and customizing a subset of the templatized data quality tests in accordance with the new profile metadata to create the plurality of customized data quality tests.

Clause 22: The method of Clauses 20 or 21, wherein generating the plurality of customized data quality tests is based on a subset of the data quality tests associated with the existing profile metadata having a data quality level consistent with the determined data quality level of the new data structure.

Clause 23: The method of any of Clauses 19-22 further including: scheduling the plurality of customized data quality tests based on comparing the new profile metadata to the existing profile metadata; and executing the scheduled customized data quality tests.

Clause 24: The method of Clause 23, further including executing the scheduled customized data quality tests upon transfer of the new data structure.

Clause 25: The method of any of Clauses 19-24 further including: identifying a change in the new data structure; reprofiling the new data structure in response to identifying the change in the new data structure to generate updated profile metadata for the new data structure; determining an updated data quality level for the new data structure by comparing the updated profile metadata to the existing profile metadata; and generating a plurality of updated customized data quality tests for the new data structure based on the updated data quality level.

Clause 26: The method of Clause 25 further including: determining that the updated data quality level of the new data structure is greater than the determined data quality level; and generating one or more data quality tests for the new data structure that are not required by the new quality level and are required for the updated data quality level.

What is claimed is:

1. A system comprising:
    at least one processor; and
    at least one memory having stored thereon instructions that, when executed by the at least one processor, controls the at least one processor to:
        profile a plurality of existing data structures to generate existing profile metadata;
        identify a data quality level assigned to the plurality of existing data structures;
        access a new data structure;
        profile the new data structure to generate new profile metadata;
        determine a data quality level for the new data structure by comparing the new profile metadata to the existing profile metadata; and
        generate a plurality of customized data quality tests for the new data structure based on the determined data quality level for the new data structure.

2. The system of claim 1, wherein
    the instructions, when executed by the at least one processor, further control the at least one processor to analyze the plurality of existing data structures to determine data quality tests associated with the existing profile metadata, and
    the plurality of customized data quality tests is generated based on the data quality tests associated with the existing profile metadata.

3. The system of claim 2, wherein the instructions, when executed by the at least one processor, further control the at least one processor to generate the plurality of customized data quality tests by:
   templatizing the data quality tests associated with the existing profile metadata; and
   customizing a subset of the templatized data quality tests in accordance with the new profile metadata to create the plurality of customized data quality tests.

4. The system of claim 2, wherein the instructions, when executed by the at least one processor, further control the at least one processor to generate the plurality of customized data quality tests based on a subset of the data quality tests associated with the existing profile metadata having a data quality level consistent with the determined data quality level of the new data structure.

5. The system of claim 1, wherein the instructions, when executed by the at least one processor, further control the at least one processor to:
   schedule the plurality of customized data quality tests based on comparing the new profile metadata to the existing profile metadata; and
   execute the scheduled customized data quality tests.

6. The system of claim 5, wherein the plurality of customized data quality tests are scheduled to execute in accordance with at least one from among a transfer of the data structure, a periodic schedule, and in accordance with a n access-rate schedule structure.

7. The system of claim 1, wherein the instructions, when executed by the at least one processor, further control the at least one processor to:
   identify a change in the new data structure;
   reprofile the new data structure in response to identifying the change in the new data structure to generate updated profile metadata for the new data structure;
   determine an updated data quality level for the new data structure by comparing the updated profile metadata to the existing profile metadata; and
   generate a plurality of updated customized data quality tests for the new data structure based on the updated data quality level.

8. The system of claim 7, wherein the instructions, when executed by the at least one processor, further control the at least one processor to, in response to determining that the updated data quality level of the new data structure is greater than the determined data quality level, generate one or more data quality tests for the new data structure that are not required by the determined quality level and are required for the updated data quality level.

9. The system of claim 7, wherein identifying the change in the new data structure comprises receiving, from a database storing the new data structure, an indication that the new data structure has been modified by at least one from among, adding a data element field to the new data structure, removing a data element field to the new data structure, and reclassifying the new data structure.

10. The system of claim 1, wherein the instructions, when executed by the at least one processor, further control the at least one processor to determine a data quality level for the new data structure by:
    extracting, for each of a plurality of data elements within the new profile metadata, a data element name, data element type, and data element structure;
    matching the data element name, data element type, and data element structure of one or more of the plurality of data elements within the new profile metadata to respective data elements within the existing profile metadata; and
    assigning a data quality level to the new data structure based on the matching.

11. The system of claim 10, wherein
    the instructions, when executed by the at least one processor, further control the at least one processor to analyze the existing profile metadata to identify one or more critical data elements,
    the matching comprises matching the data element name, data element type, and data element structure of one or more of the plurality of data elements within the new profile metadata to respective critical data elements of the one or more critical data elements, and
    assigning a data quality level to the new data structure comprises assigning the data quality level based on the matched critical data element.

12. The system of claim 1, wherein identifying the data quality level assigned to a first existing data structure of the plurality of existing data structures comprises:
    identifying one or more data quality tests associated with the existing profile metadata of the first existing data structure;
    determining that the one or more one or more data quality tests associated with the existing profile metadata of the first existing data structure conform closest to a first data quality level of a plurality data quality levels; and
    identifying the first data quality level as the data quality level assigned to a first existing data structure.

13. The system of claim 12, the instructions, when executed by the at least one processor, further control the at least one processor to:
    determine that the one or more data quality tests associated with the existing profile metadata of the first existing data structure do not completely conform to the first data quality level, and
    generate one or more customized data quality tests for the first existing data structure to be added to the one or more data quality tests associated with the existing profile metadata of the first existing data structure.

14. The system of claim 1, wherein the instructions, when executed by the at least one processor, further control the at least one processor to:
    schedule the plurality of customized data quality tests;
    track an error detection rate of the scheduled plurality of customized data quality tests; and
    throttle the schedule in response to the error detection rate exceeding a predetermined threshold.

15. A system comprising:
    at least one processor; and
    at least one memory having stored thereon instructions that, when executed by the at least one processor, controls the at least one processor to:
    profile a plurality of existing data structures to generate existing profile metadata;
    analyze the plurality of existing data structures to determine data quality tests associated with the existing profile metadata;
    store the data quality tests associated with the existing profile metadata in correspondence with the existing profile metadata;
    identify a change in profile metadata for a first existing data structure of the plurality of existing data structures indicative of an update to the first existing data structure;

reprofile the first existing data structure to generate new profile metadata; and generate a plurality of customized data quality tests for the first existing data structure based on the new profile metadata and the data quality tests associated with the existing profile metadata.

16. The system of claim 15, wherein the instructions, when executed by the at least one processor, further control the at least one processor to determine that a new data quality level of the first existing data structure is greater than an existing data quality level for the first existing data structure, and generating the plurality of customized data quality tests for the first existing data structure comprises generating one or more customized data quality tests for the first existing data structure that are not required by the existing data quality level and are required for the new data quality level.

17. The system of claim 15, wherein the instructions, when executed by the at least one processor, further control the at least one processor to determine that a new data quality level of the first existing data structure is less than an existing data quality level for the first existing data structure, and generating the plurality of customized data quality tests for the first existing data structure comprises de-scheduling data quality tests required for the existing data quality level and not required for the new data quality level.

18. A data quality control method comprising:

profiling a plurality of existing data structures to generate existing profile metadata;

identifying a data quality level assigned to the plurality of existing data structures;

accessing a new data structure;

profiling the new data structure to generate new profile metadata;

determining a data quality level for the new data structure by comparing the new profile metadata to the existing profile metadata; and generating a plurality of customized data quality tests for the new data structure based on the determined data quality level for the new data structure.

19. The method of claim 18 further comprising analyzing the plurality of existing data structures to determine data quality tests associated with the existing profile metadata, wherein the plurality of customized data quality tests are generated based on the data quality tests associated with the existing profile metadata.

20. The method of claim 19, wherein generating the plurality of customized data quality tests comprises:

templatizing the data quality tests associated with the existing profile metadata; and customizing a subset of the templatized data quality tests in accordance with the new profile metadata to create the plurality of customized data quality tests.

* * * * *